United States Patent Office 2,971,033
Patented Feb. 7, 1961

2,971,033
ALCOHOL MANUFACTURE

Martin W. Farrar, Webster Groves, Mo., assignor to Monsanto Chemical Company, St. Louis, Mo., a corporation of Delaware No Drawing. Filed Aug. 22, 1957, Ser. No. 679,754

6 Claims. (Cl. 260—642)

This invention relates to the manufacture of alcohols from alcohols of lower molecular weight. More particularly this invention relates to a new and improved catalyst for the Guerbet reaction.

According to the Guerbet reaction, which is well known to the organic chemist, a primary or secondary aliphatic alcohol containing a methylene group attached to the carbon atom of the carbinol group is condensed with itself or with another aliphatic alcohol to form as the principal product a higher alcohol containing twice the number of carbon atoms of the starting alcohol, for example, n-butanol is condensed to 2-ethylhexanol. Similarly a mixture of ethanol and n-butanol condenses to form n-butanol, 2-ethylhexanol, n-hexanol, and 2-ethylbutanol. A certain amount of condensation does occur between the principal higher alcohol product and unreacted starting alcohol, with itself, and with other alcohols produced by the reaction if present, and so on to provide a series of high molecular weight alcohols which theoretically can involve any two molecules present in the reaction mixture at a given time provided, of course, one of the molecules is an alcohol which contains a methylene group attached to the carbon atom of the carbinol group. In addition to the higher alcohols formed by the condensation of two molecules of alcohols present in the reaction, the catalysts heretofore employed caused a number of side reactions providing other materials, principally carboxylic acids and esters thereof.

It is an object of this invention to provide a new catalyst for the Guerbet reaction. Another object is to provide a method for the condensation of primary or secondary aliphatic alcohols which contain a methylene group attached to the carbon atom of the carbinol group, to provide higher alcohols. A further object is to increase the yield of the principal higher alcohol formed by direct condensation of a starting alicyclic or acyclic alcohol. Another and particular object of this invention is to minimize formation of by-product acids and esters in the Guerbet reaction. Further objects and advantages of this invention will be apparent from the following description.

In accordance with this invention the Guerbet reaction is effected in the presence of a mixture of potassium carbonate, magnesium oxide and copper chromite. By using this new catalyst mixture excellent results in carrying out the Guerbet reaction are obtained with a variety of primary and secondary aliphatic alcohols which alcohols contain a methylene group attached to the carbon atom of the carbinol group. In each instance the yields are high while the formation of acid and ester by-products is negligible.

Any catalytic amount of the aforementioned mixture of potassium carbonate, magnesium oxide and copper chromite can be used. Preferably the amount of the mixture will be about 5 to 20% by weight based on the alcohol charged to the reaction, and it is particularly preferred that the respective components of the catalyst mixture be present in substantially equal amounts. The quantity of catalyst obviously will be dependent to some extent upon the particular alcohol or mixture of alcohols charged, the temperatures, time conditions, as well as other variables as will be understood by those skilled in the art.

The optimum temperature to be used will vary with the alcohol charged, but usually will be in the neighborhood of the critical temperature of the particular alcohol. In general the reaction can be effected at a temperature of about the critical temperature ±50° C., the temperature employed, however, being that which provides a minimum of decomposition and side reactions.

A suitable time of reaction for a batch process ordinarily will be in the range of 4 to 10 hours, but preferably about 8 hours. Usually the reaction time for a continuous flow-type process is less than 6 hours. In a given instance a time of reaction will be selected to give a satisfactory economic balance between high conversion of starting alcohol to products other than the starting alcohol and high ultimate yield of desired higher alcohol.

The process of this invention is ordinarily carried out under pressure, the autogenous pressure being preferred.

The process of this invention is useful in converting numerous primary and secondary aliphatic alcohols to higher alcohols, e.g. ethyl alcohol on upward without any particular limit in number of carbon atoms being encountered other than that of reasonable thermal stability at the reaction conditions. Thus an alicyclic or an acyclic alcohol of the structure

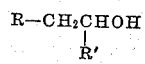

where R and R' are either hydrogen or an alkyl radical (straight chain or branched chain) containing 1 to 18 carbon atoms or any mixture thereof can be used. As illustrative of such are ethyl alcohol, n-propyl alcohol, isopropyl alcohol, n-butanol, 4-methylpentanol-2, n-hexanol, n-octanol, octanol-2, cyclohexanol, and the like.

Other catalyst combinations were found to be less effective than the three component system involving potassium carbonate, magnesium oxide and copper chromite. Substitution of sodium carbonate for potassium carbonate resulted in a much lower conversion. Raney nickel was substituted for copper chromite with essentially the same conversion to higher alcohols, but an appreciable amount of the starting alcohol was converted to gaseous by-products when this was done. Manganese chromite and copper-magnesium chromite, when substituted for copper chromite, gave a lower conversion. When magnesium oxide was omitted from the catalyst system, only about 10% conversion was obtained. Calcium oxide functioned poorly in the place of magnesium oxide.

To illustrate the instant invention is the following:

The autoclave used in the following examples was constructed of steel and had a capacity of 1.3 liters. It was fitted with an impeller agitator, thermometer well, pressure gauge, and vapor and liquid sampling outlets. Heating was accomplished by a series of electrical strip heaters.

*Condensation of ethanol by potassium carbonate, magnesium oxide and copper chromite.*—The autoclave was charged with 368 g. (8.0 moles) of dry ethanol, 18.5 g. of anhydrous potassium carbonate, 18.5 g. of magnesium oxide (light powder) and 18.5 g. of copper chromite catalyst. The mixture was then heated rapidly with stirring to 225–230° and held at this temperature for eight hours during which time a pressure of 900–1000 p.s.i.g. was developed. At the end of the heating period the autoclave was cooled and the contents transferred to a distilling flask where the unreacted ethanol and water by-product was separated by direct distillation. The recovered ethanol amounted to 248.5 g. The residue containing higher alcohols and catalyst was steam distilled to separate the alcohols from the catalyst. After drying, the alcohol product was subjected to fractional distillation. There was obtained 37.3 g. of 1-butanol, B.P. 116–118° (13% conversion, 47% yield on the ethanol actually used), 10.3 g. of hexyl alcohols, B.P. 150–169° (3.7% conversion, 11% yield on the ethanol used), and a residue amounting to 11.8 g. (4.5% conversion, 14% yield calculated as octyl alcohols). (Redistillation of the fraction, B.P. 150–169°, yielded approximately equal parts of 2-ethyl-1-butanol, B.P. 149–151°, and 1-hexanol, B.P. 156–158°.) Acidification of the steam distillation residue with sulfuric acid followed by further steam distillation effected isolation of the carboxylic acids produced during the higher alcohol formation. Titration showed a total of 0.035 equivalent to be present, which represents a ratio of higher alcohol to carboxylic acid of approximately twenty to one.

*Condensation of 1-butanol by potassium carbonate, magnesium oxide and copper chromite.*—The autoclave was charged with 370 g. (5.0 moles) of 1-butanol, 18.5 g. of anhydrous potassium carbonate, 18.5 g. of magnesium oxide (light powder) and 18.5 g. of copper chromite. It was heated rapidly with stirring to 245–250° and maintained at this temperature for eight hours during which time the pressure registered 700–800 p.s.i.g. At the end of the heating period the autoclave was cooled and its contents was subjected to steam distillation to recover butanol and higher alcohols. Redistillation of the organic phase resulted in a recovery of 278 g. 1-butanol and 58.6 g. of 2-ethyl-1-hexanol, B.P. 180–182° (18% conversion, 70% yield on the 1-butanol actually used).

Although it is preferred to use the catalyst mixture in substantially equal weight proportion of its component parts, i.e. equi-weights of potassium carbonate, magnesium oxide and copper chromite, the weight ratio of component parts of the mixture may vary. For example, for each two parts of potassium carbonate from 1 to 3 parts magnesium oxide and from 1 to 3 parts of copper chromite may be employed.

While this invention has been described with respect to certain embodiments it is to be understood it is not so limited in that variations and modifications thereof obvious to those skilled in the art may be employed without departing from the spirit and scope of this invention.

What is claimed is:

1. The process for producing higher alcohols by the Guerbet reaction which comprises condensing aliphatic alcohols having a methylene group attached to the carbon atom of the carbinol group in the presence of a mixture of (a) potassium carbonate, (b) magnesium oxide, and (c) copper chromite, the weight ratio of (a):(b):(c) being about 2:1 to 3:1 to 3.

2. The process for producing higher alcohols by the Guerbet reaction which comprises condensing aliphatic alcohols having a methylene group attached to the carbon atom of the carbinol group in the presence of a mixture of (a) potassium carbonate, (b) magnesium oxide, and (c) copper chromite, the weight ratio of (a):(b):(c) being about 2:1 to 3:1 to 3, and the total weight of (a), (b) and (c) being from about 5% to about 20% of the weight of said alcohols.

3. The process of claim 2 wherein the weight ratio of (a):(b):(c) is about 1:1:1.

4. The process which comprises condensing an aliphatic alcohol having a methylene group attached to the carbon atom of the carbinol group to produce higher alcohols at a temperature in the range of from 50° C. below to 50° C. above the critical temperature of said aliphatic alcohol and at the autogenous pressure of the reaction mixture and in the presence of a catalytic amount in the range of 5 to 20% by weight based on the alcohol charged of a mixture of substantially equal weights of potassium carbonate, magnesium oxide and copper chromite.

5. The process of claim 4 wherein the aliphatic alcohol is ethyl alcohol.

6. The process of claim 4 wherein the aliphatic alcohol is n-butyl alcohol.

References Cited in the file of this patent

UNITED STATES PATENTS

| | | |
|---|---|---|
| 1,910,582 | Wibaut | May 23, 1933 |
| 1,992,480 | Fuchs | Feb. 26, 1935 |
| 2,004,350 | Scott | June 11, 1935 |
| 2,145,097 | Scott | Jan. 24, 1939 |
| 2,457,866 | Carter | Jan. 4, 1949 |
| 2,762,847 | Miller et al. | Sept. 11, 1956 |